United States Patent
Kobayashi

(10) Patent No.: US 7,334,899 B2
(45) Date of Patent: Feb. 26, 2008

(54) IMAGE PROCESSING SYSTEM, PROJECTOR, INFORMATION STORAGE MEDIUM, AND IMAGE PROCESSING METHOD

(75) Inventor: Masanobu Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 62 days.

(21) Appl. No.: 10/944,075

(22) Filed: Sep. 20, 2004

(65) Prior Publication Data

US 2005/0094108 A1    May 5, 2005

(30) Foreign Application Priority Data

Sep. 26, 2003 (JP) ............... 2003-334981
May 20, 2004 (JP) ............... 2004-150081

(51) Int. Cl.
*G03B 21/00* (2006.01)
*G03B 21/14* (2006.01)

(52) U.S. Cl. ........................ 353/69; 353/121
(58) Field of Classification Search .......... 353/69, 353/70, 121; 348/806
See application file for complete search history.

(56) References Cited

U.S. PATENT DOCUMENTS

| | | | |
|---|---|---|---|
| 6,310,662 B1 | 10/2001 | Sunakawa et al. | |
| 6,416,186 B1 | 7/2002 | Nakamura | |
| 6,939,011 B2 | 9/2005 | Kobayashi | |
| 7,092,045 B2 | 8/2006 | Haruna et al. | |
| 2002/0105623 A1 | 8/2002 | Pinhanez | 353/69 |
| 2005/0036117 A1 | 2/2005 | Kobayashi | |
| 2006/0164630 A1* | 7/2006 | Hofbauer | 356/141.1 |

FOREIGN PATENT DOCUMENTS

| | | |
|---|---|---|
| JP | A-8-9309 | 1/1996 |
| JP | A 2000-241874 | 9/2000 |
| JP | A-2001-61121 | 3/2001 |
| JP | A 2002-247614 | 8/2002 |
| JP | A-2004-134908 | 4/2004 |
| JP | A-2004-312690 | 11/2004 |
| JP | A-2005-33703 | 2/2005 |
| WO | WO 99/14716 A | 3/1999 |
| WO | WO 02/21832 A2 | 3/2002 |

* cited by examiner

*Primary Examiner*—Christopher Mahoney
(74) *Attorney, Agent, or Firm*—Oliff & Berridge, PLC

(57) ABSTRACT

An image processing system including: a distortion correction section which corrects an image signal so as to adjust image distortion; an image projection section which projects an image based on the image signal; a sensing section which senses the projected image along an optical axis which does not coincide with an optical axis of the image projection section in order to generate sensing information; an image analysis section which generates edge point information and brightness index value distribution information, based on the sensing information, the edge point information showing a position of a predetermined edge point of the projected image in the sensed image, and brightness index value distribution information showing a distribution of brightness index values of the projected image; and a correction information generation section which generates projection distance information which shows a projection distance, based on the edge point information, and generates correction information for correcting the image signal, based on the projection distance information and the brightness index value distribution information.

20 Claims, 15 Drawing Sheets

FIG. 8

| MIDPOINT CAMERA COORDINATE (X) | PROJECTION DISTANCE (m) |
|---|---|
| 361 | 1 |
| 340 | 2 |
| 333 | 3 |
| 330 | 4 |
| 328 | 5 |
| ⋮ | ⋮ |

FIG. 10

| LENGTH OF AB+CD (dot) | HALF ANGLE OF VIEW (DEGREE) |
|---|---|
| 665 | 22 |
| 459 | 15 |

FIG. 11

| HORIZONTAL PROJECTION ANGLE (DEGREE, WITHOUT CORRECTION) | PROJECTION DISTANCE | HORIZONTAL PROJECTION ANGLE (DEGREE, WITH CORRECTION) |
|---|---|---|
| −17 | 1m | −20 |
| −8 | 1m | −10 |
| +2 | 1m | 0 |
| +11 | 1m | +10 |
| +21 | 1m | +20 |
| −19 | 2m | −20 |
| ⋮ | ⋮ | ⋮ |

IMAGE PROCESSING SYSTEM, PROJECTOR, INFORMATION STORAGE MEDIUM, AND IMAGE PROCESSING METHOD

Japanese Patent Application No. 2003-334981, filed on Sep. 26, 2003, and Japanese Patent Application No. 2004-150081, filed on May 20, 2004, are hereby incorporated by reference in their entirety.

BACKGROUND OF THE INVENTION

The present invention relates to an image processing system, a projector, a program, an information storage medium, and an image processing method capable of correcting image distortion.

There may be a case where image distortion occurs depending on the relative angle formed by the optical axis of projection light from an image projection device, such as a projector, and a projection target such as a screen, whereby keystone distortion occurs in the vertical direction or horizontal direction.

Therefore, an image projection device must project an image while eliminating image distortion.

A conventional image projection device with an image distortion correction function includes an angle sensor, and corrects image distortion in the vertical direction using the angle sensor, but cannot correct image distortion in the horizontal direction.

In the case of correcting image distortion in the horizontal direction, a user points at the four corners of the screen using a mouse or the like, and the image projection device semi-automatically corrects the image distortion based on the point information. However, it is troublesome for the user to point at the four corners of the screen using a mouse or the like.

In order to solve such a problem, Japanese Patent Application Laid-open No. 2000-241874 employs a method in which a screen and an all-white image on the screen are sensed by using a monitor camera, and keystone distortion is adjusted based on the edge points of the screen and the edge points of the all-white image, for example.

However, in the method of adjusting keystone distortion using the information on the shape of the screen as in Japanese Patent Application Laid-open No. 2000-241874, the user necessarily uses the screen. Therefore, in the case where the projector projects an image onto a frameless projection target such as a wall, keystone distortion cannot be corrected by using the method disclosed in Japanese Patent Application Laid-open No. 2000-241874. Moreover, since the method disclosed in Japanese Patent Application Laid-open No. 2000-241874 assumes that the screen is rectangular, this method is lacking in universality.

BRIEF SUMMARY OF THE INVENTION

The present invention has been achieved in view of the above-described problems. The present invention may provide an image processing system, a projector, a program, an information storage medium, and an image processing method capable of correcting distortion of the projected image in the horizontal direction without using information on the shape of the projection target.

According to a first aspect of the present invention, there are provided an image processing system and a projector, each of which comprises:

correction means for correcting an image signal so as to adjust image distortion;

image projection means for projecting an image based on the image signal;

sensing means for sensing the projected image along an optical axis which does not coincide with an optical axis of the image projection means in order to generate sensing information;

image analysis means for generating edge point information and brightness index value distribution information, based on the sensing information, the edge point information showing a position of a predetermined edge point of the projected image in the sensed image, and the brightness index value distribution information showing a distribution of brightness index values of the projected image; and correction information generation means for generating projection distance information which shows a projection distance, based on the edge point information, and generating correction information for correcting the image signal, based on the projection distance information and the brightness index value distribution information;

wherein the correction information generation means generates temporary correction information based on the brightness index value distribution information and corrects the temporary correction information to generate the correction information in which the optical axis of the sensing means coincides with the optical axis of the image projection means, based on the projection distance information; and wherein the correction means corrects the image signal based on the correction information.

According to a second aspect of the present invention, there are provided an image processing system and a projector, each of which comprises:

a correction section which corrects an image signal so as to adjust image distortion;

an image projection section which projects an image based on the image signal;

a sensing section which senses the projected image along an optical axis which does not coincide with an optical axis of the image projection section in order to generate sensing information;

an image analysis section which generates edge point information and brightness index value distribution information, based on the sensing information, the edge point information showing a position of a predetermined edge point of the projected image in the sensed image, and brightness index value distribution information showing a distribution of brightness index values of the projected image; and a correction information generation section which generates projection distance information showing a projection distance, based on the edge point information, and generates correction information for correcting the image signal, based on the projection distance information and the brightness index value distribution information;

wherein the correction information generation section generates temporary correction information based on the brightness index value distribution information and corrects the temporary correction information to generate the correction information in which the optical axis of the sensing section coincides with the optical axis of the image projection section, based on the projection distance information; and wherein the correction section corrects the image signal based on the correction information.

According to a third aspect of the present invention, there is provided a computer-readable program causing a computer to function as:

correction means for correcting an image signal so as to adjust image distortion;

image projection means for projecting an image based on the image signal;

sensing means for sensing the projected image along an optical axis which does not coincide with an optical axis of the image projection means in order to generate sensing information;

image analysis means for generating edge point information and brightness index value distribution information, based on the sensing information, the edge point information showing a position of a predetermined edge point of the projected image in the sensed image, and brightness index value distribution information showing a distribution of brightness index values of the projected image; and correction information generation means for generating projection distance information which shows a projection distance, based on the edge point information, and generating correction information for correcting the image signal, based on the projection distance information and the brightness index value distribution information;

wherein the correction information generation means generates temporary correction information based on the brightness index value distribution information and corrects the temporary correction information to generate the correction information in which the optical axis of the sensing means coincides with the optical axis of the image projection means, based on the projection distance information; and wherein the correction means corrects the image signal based on the correction information.

According to a fourth aspect of the present invention, there is provided an information storage medium storing the above computer-readable program.

According to a fifth aspect of the present invention, there is provided an image processing method comprising:

projecting a predetermined calibration image onto a predetermined projection target by using an image projection section;

sensing the projected image along an optical axis which does not coincide with an optical axis of the image projection section in order to generate sensing information by using a sensing section;

generating edge point information and brightness index value distribution information, based on the sensing information, the edge point information showing a position of a predetermined edge point of the projected image in the sensed image, and the brightness index value distribution information showing a distribution of brightness index values of the projected image;

generating projection distance information which shows a projection distance based on the edge point information;

generating temporary correction information based on the brightness index value distribution information;

correcting the temporary correction information to generate the correction information in which an optical axis of the sensing section coincides with the optical axis of the image projection section, based on the projection distance information; and correcting an image signal based on the correction information so as to adjust image distortion.

According to the present invention, the image processing system and others can determine image distortion based on the distribution of the brightness index values. In particular, if the optical axis of the image projection means does not coincide with the optical axis of the sensing means, the distribution of the brightness index values of the projected image sensed by the sensing means changes depending on the projection distance.

According to the present invention, the image processing system and others can generate the temporary correction information based on the distribution of the brightness index values, generate the correction information by correcting the temporary correction information on the basis of the projection distance, and correct the image signal based on the correction information so as to adjust image distortion.

As described above, according to the present invention, the image processing system and others can correct distortion of the projected image in the horizontal direction by performing the image processing based on the distribution of the brightness index values without using information on the shape of the projection target. Moreover, the image processing system and others can more accurately correct distortion of the projected image in the horizontal direction by generating the correction information based on the projection distance.

In each of the above image processing system, projector, program and information storage medium, the correction information generation means may generate projected image size information which shows a size of the projected image in the sensed image, based on the edge point information, and generate zoom state information which shows a zoom state of the image projection means, based on the projected image size information; and the correction means may use the zoom state information to adjust an amount of correction of the image signal based on the correction information.

In the above image processing method, projected image size information which shows a size of the projected image in the sensed image may be generated based on the edge point information when generating the correction information; zoom state information which shows a zoom state at the time of image projection may be generated based on the projected image size information; and the zoom state information may be used to adjust an amount of correction of the image signal based on the correction information.

This enables the image processing system and others to correct image distortion more accurately by adjusting the amount of correction of the image signal on the basis of the zoom state at the time of image projection.

If the zoom state information shows a tele state, the correction means may reduce relatively the amount of correction in comparison with the case where the zoom state information shows a wide state.

In each of the above image processing system, projector, program and information storage medium, the brightness index value distribution information may include information showing the brightest peak position of the projected image in the sensed image; and the correction information generation means may generate the temporary correction information based on the information showing the brightest peak position, the edge point information, and the projection distance information.

In the above image processing method, the brightness index value distribution information may include information showing the brightest peak position of the projected image in the sensed image; and the temporary correction information may be generated based on the information showing the brightest peak position, the edge point information, and the projection distance information.

This enables the image processing system and others to determine image distortion on the basis of the peak position.

According to a sixth aspect of the present invention, there are provided an image processing system and a projector, each of which comprises:

correction means for correcting an image signal so as to adjust image distortion;

image projection means for projecting an image based on the image signal, having a focus control function;

sensing means for sensing the projected image along an optical axis which does not coincide with an optical axis of the image projection means in order to generate sensing information;

image analysis means for generating brightness index value distribution information which shows a distribution of brightness index values of the projected image in the sensed image, based on the sensing information; and correction information generation means for generating projection distance information which shows a projection distance, based on focus state information which shows a focus state of the image projection means, and generating correction information for correcting the image signal, based on the projection distance information and the brightness index value distribution information;

wherein the correction information generation means generates temporary correction information based on the brightness index value distribution information and corrects the temporary correction information to generate the correction information in which the optical axis of the sensing means coincides with the optical axis of the image projection means, based on the projection distance information; and wherein the correction means corrects the image signal based on the correction information.

According to a seventh aspect of the present invention, there are provided an image processing system and a projector, each of which comprises:

a correction section which corrects an image signal so as to adjust image distortion;

an image projection section which has a focus control function and projects an image based on the image signal;

a sensing section which senses the projected image along an optical axis which does not coincide with an optical axis of the image projection section in order to generate sensing information;

an image analysis section which generates brightness index value distribution information which shows a distribution of brightness index values of the projected image in the sensed image, based on the sensing information; and a correction information generation section which generates projection distance information which shows a projection distance, based on focus state information which shows a focus state of the image projection section, and generates correction information for correcting the image signal, based on the projection distance information and the brightness index value distribution information;

wherein the correction information generation section generates temporary correction information based on the brightness index value distribution information and corrects the temporary correction information to generate the correction information in which the optical axis of the sensing section coincides with the optical axis of the image projection section, based on the projection distance information; and wherein the correction section corrects the image signal based on the correction information.

According to an eighth aspect of the present invention, there is provided a computer-readable program causing a computer to function as:

correction means for correcting an image signal so as to adjust image distortion;

image projection means for projecting an image based on the image signal, having a focus control function;

sensing means for sensing the projected image along an optical axis which does not coincide with an optical axis of the image projection means in order to generate sensing information;

image analysis means for generating brightness index value distribution information which shows a distribution of brightness index values of the projected image in the sensed image, based on the sensing information; and correction information generation means for generating projection distance information which shows a projection distance, based on focus state information which shows a focus state of the image projection means, and generating correction information for correcting the image signal, based on the projection distance information and the brightness index value distribution information;

wherein the correction information generation means generates temporary correction information based on the brightness index value distribution information and corrects the temporary correction information to generate the correction information in which the optical axis of the sensing means coincides with the optical axis of the image projection means, based on the projection distance information; and wherein the correction means corrects the image signal based on the correction information.

According to a ninth aspect of the present invention, there is provided an information storage medium storing the above computer-readable program.

According to a tenth aspect of the present invention, there is provided an image processing method using a computer, wherein:

the computer uses an image projection section having a focus control function to project a predetermined calibration image onto a predetermined projection target;

the computer senses the projected image along an optical axis which does not coincide with an optical axis of the image projection section in order to generate sensing information by using a sensing section;

the computer generates brightness index value distribution information which shows a distribution of brightness index values of the projected image, based on the sensing information;

the computer generates projection distance information which shows a projection distance, based on focus state information which shows a focus state of the image projection section;

the computer generates temporary correction information based on the brightness index value distribution information;

the computer corrects the temporary correction information to generate the correction information in which an optical axis of the sensing section coincides with the optical axis of the image projection section, based on the projection distance information; and the computer corrects an image signal for image projection, based on the correction information so as to adjust image distortion.

According to the present invention, the image processing system and others can determine image distortion based on the distribution of the brightness index values. In particular, if the optical axis of the image projection means does not coincide with the optical axis of the sensing means, the distribution of the brightness index values of the projected image sensed by the sensing means changes depending on the projection distance.

According to the present invention, the image processing system and others can generate the temporary correction information based on the distribution of the brightness index values, generate the correction information by correcting the temporary correction information on the basis of the projection distance, and correct the image signal based on the correction information so as to adjust image distortion.

As described above, according to the present invention, the image processing system and others can correct distortion of the projected image in the horizontal direction by performing the image processing based on the distribution of the brightness index values without using information on the shape of the projection target. Moreover, the image processing system and others can more accurately correct distortion of the projected image in the horizontal direction by generating the correction information based on the projection distance.

According to the present invention, the image processing system and others can generate the projection distance information by using the focus state information. Note that the focus state information is a value which shows a focus value or the like of a projection lens or the like by an automatic focus or manual focus.

In each of the above image processing system, projector, program and information storage medium, the image projection means may have a function of controlling an angle-of-view; and the correction information generation means may use zoom state information which shows a zoom state of the image projection means to adjust an amount of correction of the image signal based on the correction information.

In the above image processing method, the image projection section may have a function of controlling an angle-of-view; and the computer may use zoom state information which shows a zoom state of the image projection section to adjust an amount of correction of the image signal based on the correction information.

This enables the image processing system and others to correct image distortion more accurately by adjusting the amount of correction of the image signal on the basis of the zoom state (angle of view) at the time of image projection.

In each of the above image processing system, projector, program and information storage medium, the brightness index value distribution information may include information on the brightest peak position of the projected image in the sensed image; the image analysis means may generate edge point information showing a position of a predetermined edge point of the projected image in the sensed image; and the correction information generation means may generate the temporary correction information based on the information showing the brightest peak position, the edge point information, and the projection distance information.

In the above image processing method, the brightness index value distribution information may include information on the brightest peak position of the projected image in the sensed image; and the computer may generate edge point information showing a position of a predetermined edge point of the projected image in the sensed image, and generate the temporary correction information based on the information showing the brightest peak position, the edge point information, and the projection distance information.

This enables the image processing system and others to determine image distortion on the basis of the peak position.

BRIEF DESCRIPTION OF THE SEVERAL VIEWS OF THE DRAWING

FIG. 8 is a table showing an example of the relationship between a midpoint camera coordinate and a projection distance.

FIG. 10 is a table showing an example of the relationship between a side length and a half angle of view.

FIG. 11 is a table showing an example of the relationship among temporary correction information, projection distance, and correction information.

DETAILED DESCRIPTION OF THE EMBODIMENTS

The present invention is described below with reference to the drawings taking the case of applying the present invention to a projector which corrects image distortion as an example. Note that the embodiments described below do not in any way limit the scope of the invention laid out in the claims herein. In addition, not all of the elements of the embodiments described below should be taken as essential requirements of the present invention.

Entire System

Figure 1:
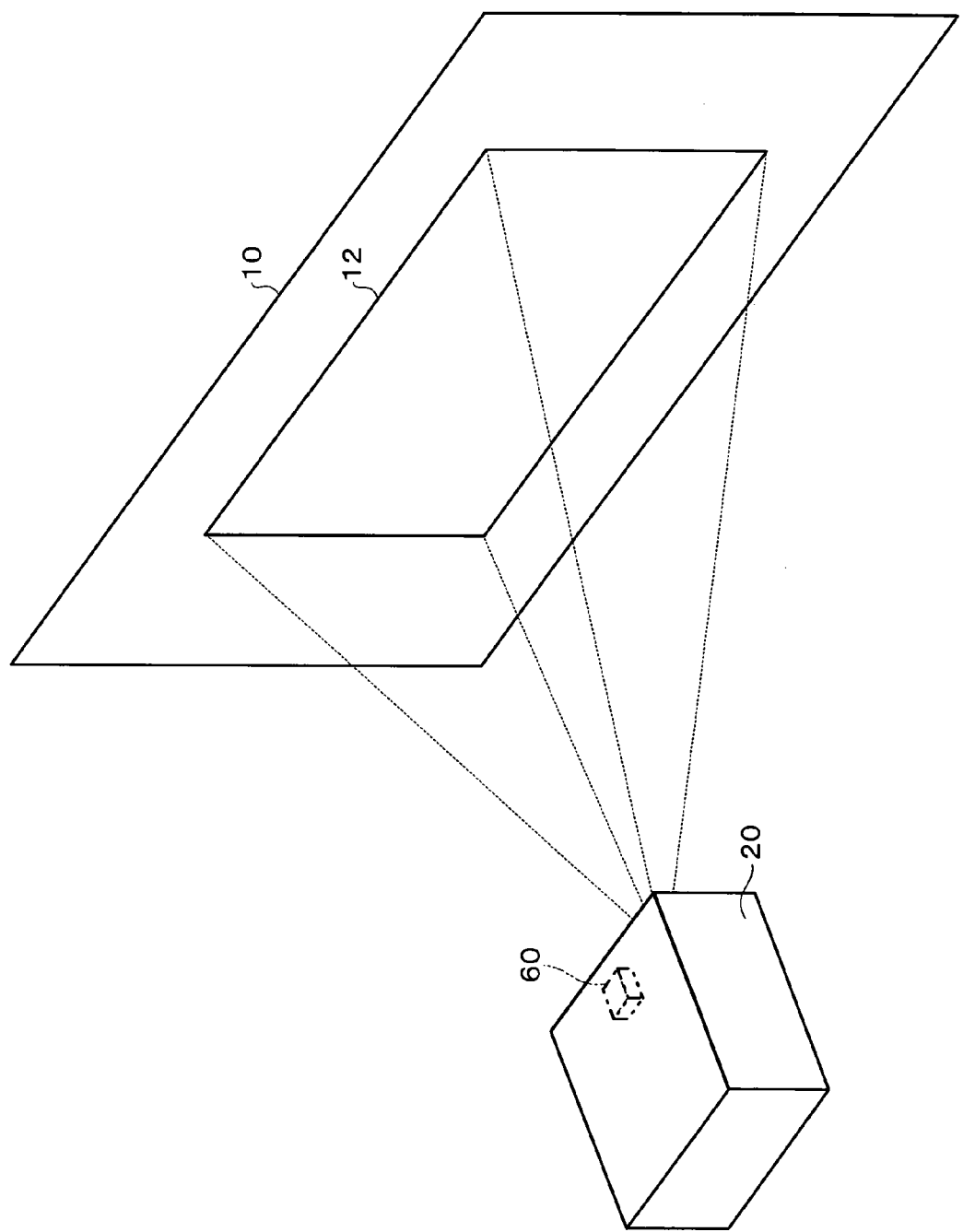
FIG. 1 is a schematic diagram for illustrating image projection.

FIG. 1 is a schematic diagram for illustrating image projection.

A projector 20, which is one type of an image processing system, projects an image onto a wall 10, which is one type of a projection target. A projected image 12 is displayed on the wall 10.

In this embodiment, the projector 20 is not disposed perpendicular to the wall 10. Therefore, distortion (keystone distortion, for example) of the projected image 12 occurs.

In this embodiment, a sensor 60, which is a part of sensing means, senses a region including the projected image 12. The projector 20 determines image distortion based on the distribution of brightness index values of the projected image in the image (sensing plane) sensed by the sensor 60.

In the case where the projector 20 projects an image onto a screen, the sensor 60 easily senses the frame of the screen. However, in the case where the projection target, such as the wall 10, is larger than the projected image, it is difficult for the sensor 60 to sense the frame of the wall 10.

As shown in FIG. 1, the optical axis of the projection light from the projector 20 does not coincide with the optical axis of the sensor 60. In this case, the distribution of the brightness index values of the projected image sensed by the sensor 60 changes depending on the projection distance.

In this embodiment, the projector 20 performs image processing in which temporary correction information is generated based on the distribution of the brightness index values without using information on the frame of the projection target, then correction information is generated by correcting the temporary correction information on the basis of the projection distance, and an image signal is corrected based on the correction information so as to adjust image distortion.

This enables the projector 20 to more appropriately adjust distortion of the projected image 12.

Functional Blocks

Functional blocks of the projector 20 for implementing the above-described functions are described below.

Figure 2:
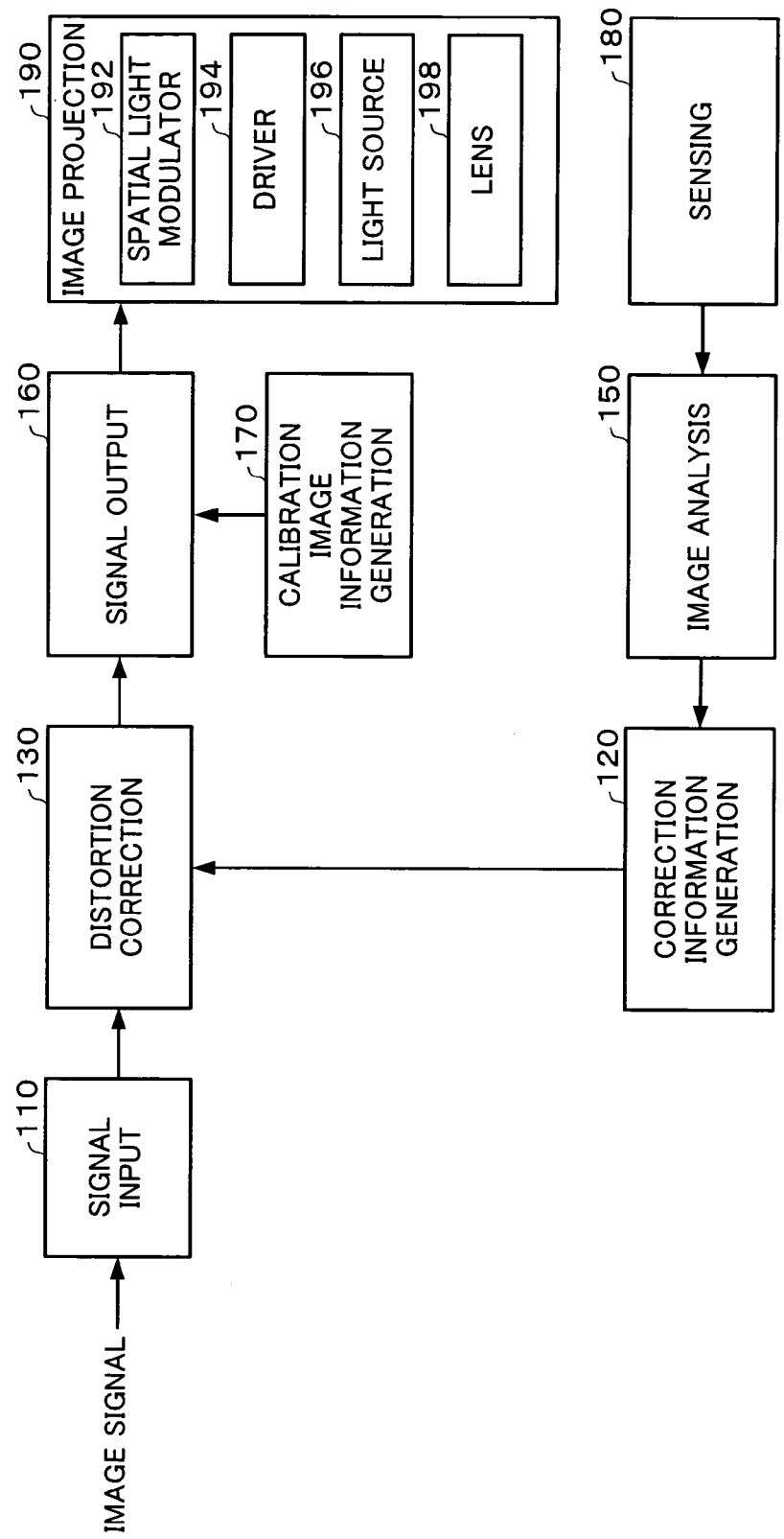
FIG. 2 is a functional block diagram showing a projector according to one embodiment of the present invention.

FIG. 2 is a functional block diagram showing the projector 20 according to one embodiment of the present invention.

The projector 20 includes a signal input section 110 to which an image signal is input, a distortion correction section 130 which corrects the input image signal so as to appropriately adjust image distortion, a signal output section 160 which outputs the corrected image signal, an image projection section 190 which projects an image based on the image signal, and a calibration image information generation section 170 which generates calibration image information.

The projector 20 includes a sensing section 180 which generates sensing information by sensing a region including the projected image 12 through the sensing plane of the sensor 60, an image analysis section 150 which generates edge point information which shows positions of the four corners of the projected image on the sensing plane (projected image in the sensed image) and brightness index value distribution information which shows the distribution of luminance values of the projected image, and a correction information generation section 120 which generates projection distance information which shows the projection distance based on the edge point information and generates correction information for correcting the image signal based on the projection distance information and the brightness index value distribution information.

The image projection section 190 includes a spatial light modulator 192, a driver section 194 which drives the spatial light modulator 192, a light source 196, and a lens 198.

The driver section 194 drives the spatial light modulator 192 based on the image signal from the signal output section 160. The image projection section 190 projects light from the light source 196 through the spatial light modulator 192 and the lens 198.

As hardware for implementing the function of each section of the projector 20 in a computer, the following hardware may be applied, for example.

Figure 3:
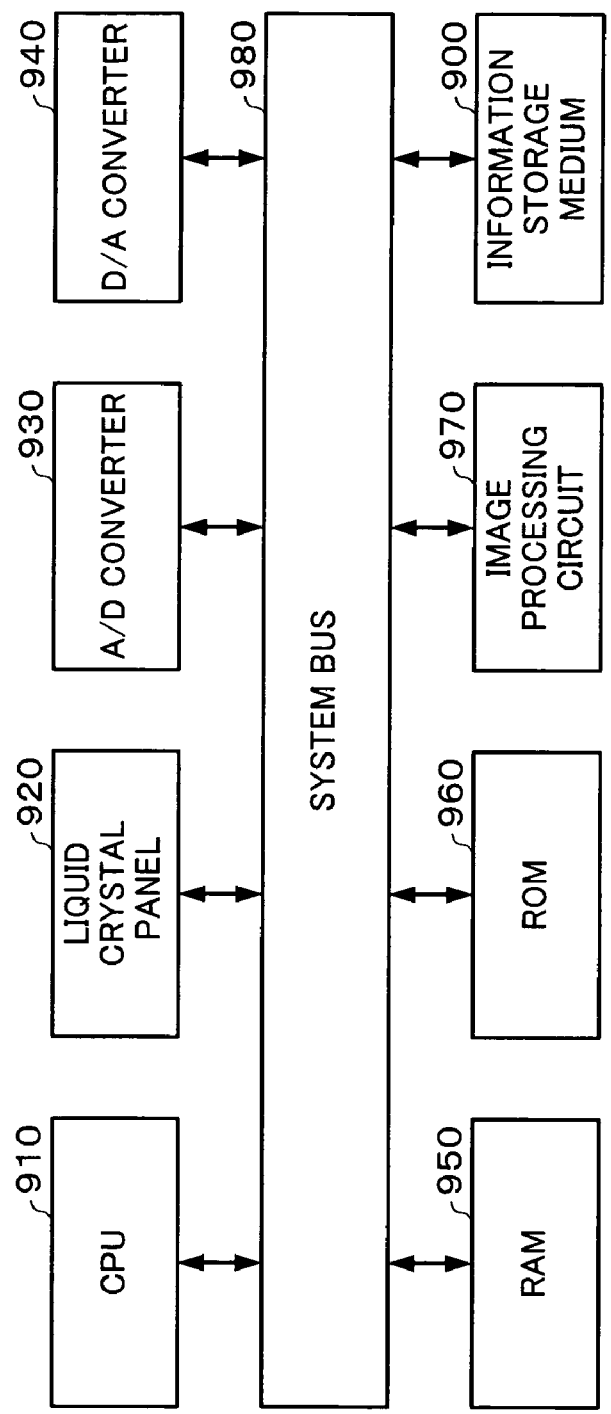
FIG. 3 is a hardware block diagram showing a projector according to one embodiment of the present invention.

FIG. 3 is a hardware block diagram showing the projector 20 according to one embodiment of the present invention.

For example, each section of the projector 20 may be implemented by using an A/D converter 930 or the like as the signal input section 110, an image processing circuit 970, RAM 950, CPU 910, or the like as the distortion correction section 130, a D/A converter 940 or the like as the signal output section 160, the image processing circuit 970, RAM 950, or the like as the correction information generation section 120, image analysis section 150, and calibration image information generation section 170, a CCD sensor, CMOS sensor, RGB sensor, or the like as the sensing section 180, a liquid crystal panel 920 or the like as the spatial light modulator 192, and a ROM 960 which stores a liquid crystal light valve driver which drives the liquid crystal panel 920 or the like as driver section 194.

These sections can exchange information through a system bus 980.

Some or the entirety of these sections may be implemented by hardware such as a circuit or may be implemented by software such as a driver.

The function of the image analysis section 150 and the like may be implemented by a computer by reading a program from an information storage medium 900 which stores a program for allowing the computer to operate as the image analysis section 150 and the like.

As the information storage medium 900, a CD-ROM, DVD-ROM, ROM, RAM, HDD, or the like may be applied. The program reading method may be either a contact method or a noncontact method.

The above-described function may be implemented by downloading a program for implementing each function or the like from a host device or the like through a transmission line instead of reading from the information storage medium 900.

Image Processing

The above-described functions will be described below in more detail.

The function of the image analysis section 150 is described below.

Figure 4:
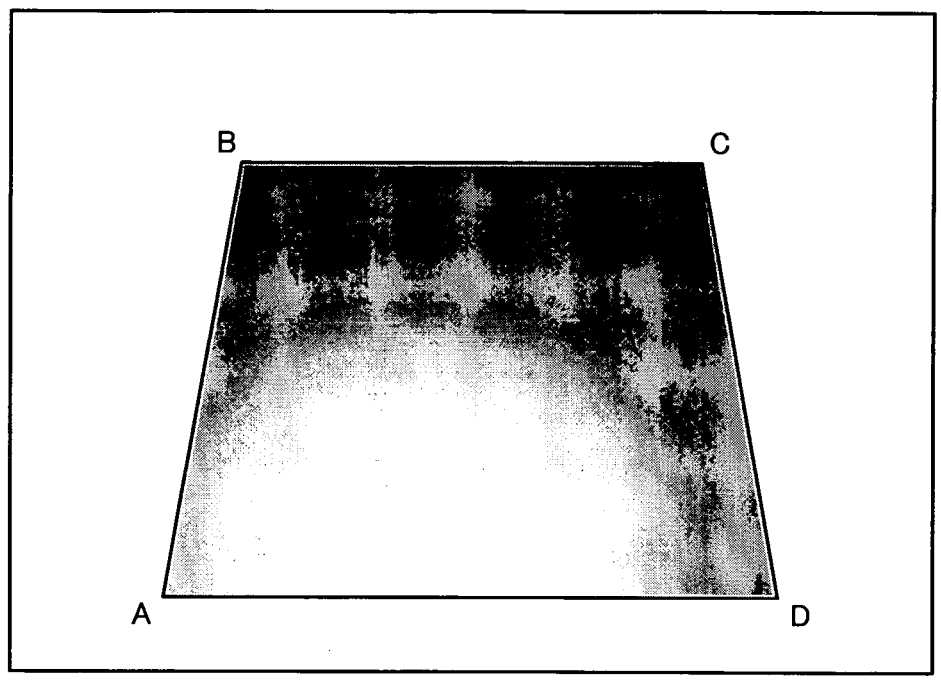
FIG. 4 is a schematic diagram showing an example of a projected image on a sensing plane.
Figure 5:
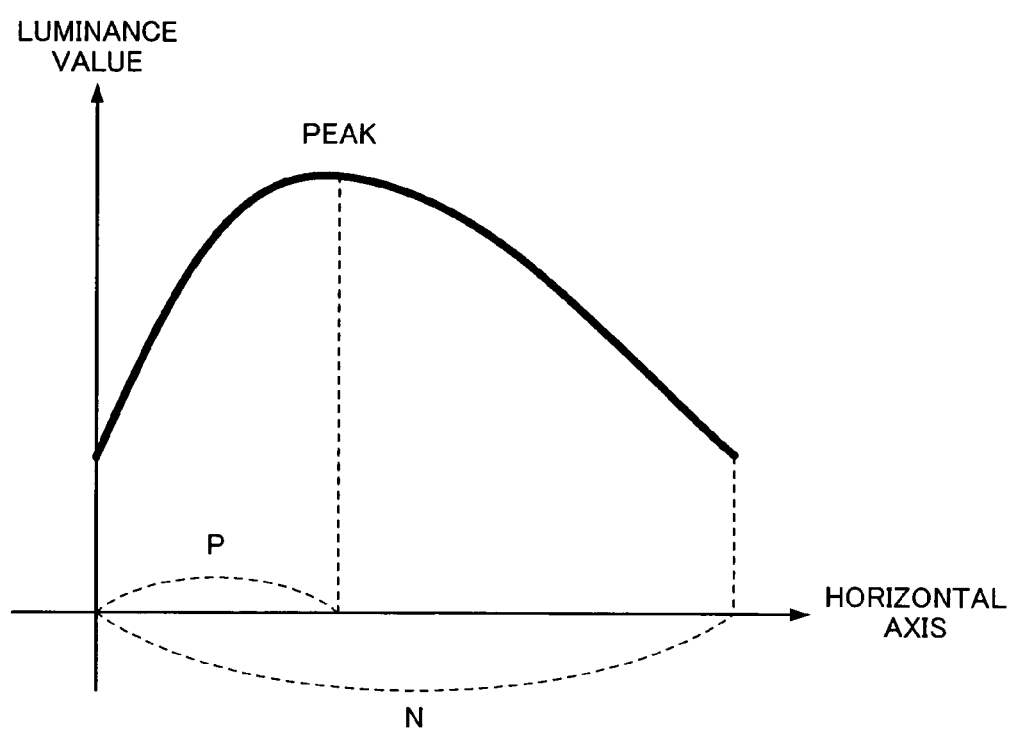
FIG. 5 shows a peak position and a pixel position in the horizontal direction.
Figure 6:
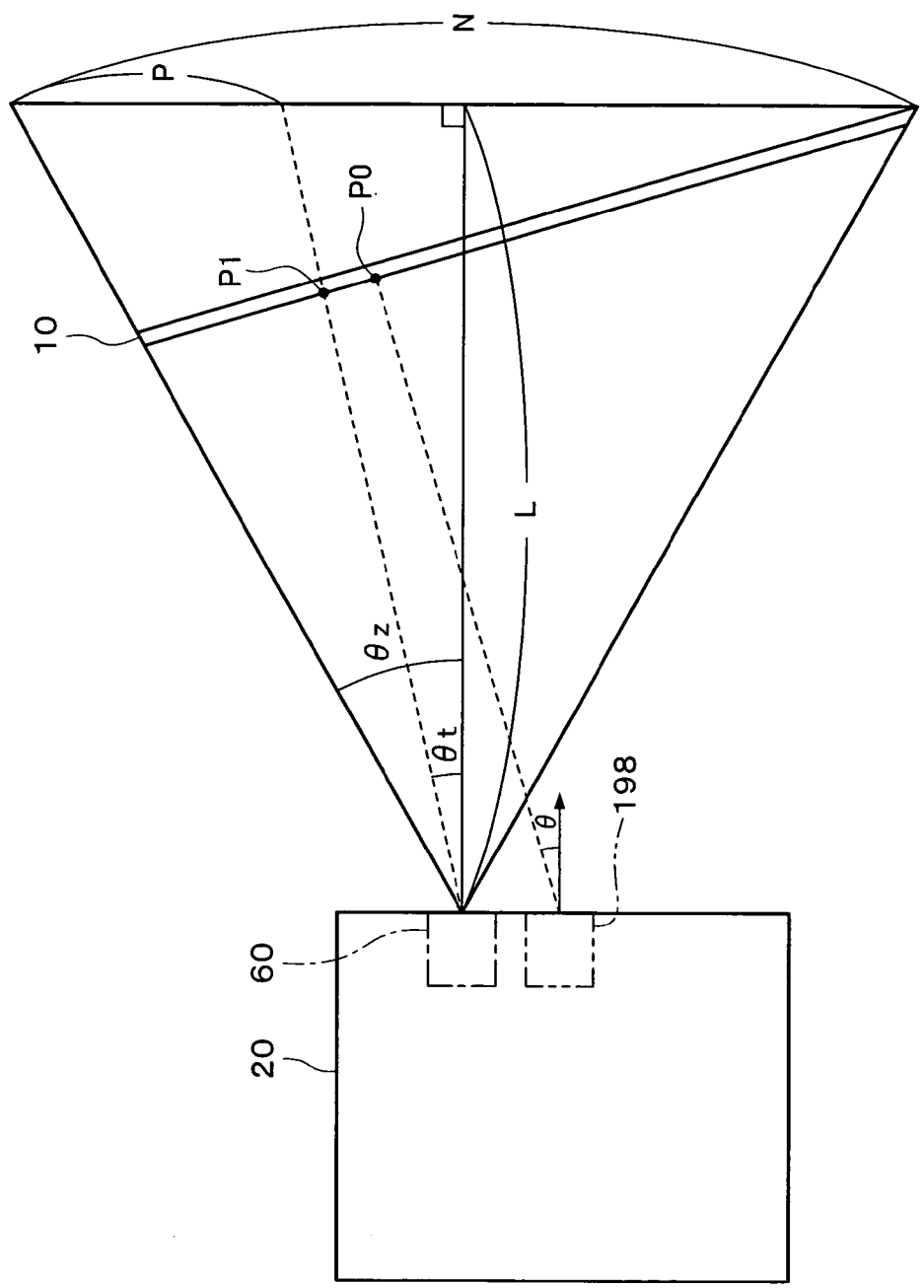
FIG. 6 is a schematic diagram two-dimensionally illustrating a projection state.

FIG. 4 is a schematic diagram showing an example of a projected image on a sensing plane. FIG. 5 shows a peak position and a pixel position in the horizontal direction. FIG. 6 is a schematic diagram two-dimensionally illustrating a projection state.

The image analysis section 150 generates the edge point information which shows the coordinate positions of four vertices A, B, C, and D of the projected image shown in FIG. 4 on the sensing plane based on the sensing information. The image analysis section 150 generates the brightness index value distribution information which shows the distribution of the luminance values shown in FIG. 5 by adding the luminance values of each pixel of the sensed image shown in FIG. 4 in the vertical direction. As a result, the brightness index value distribution information shows a peak position which is the brightest position of the projected image in the horizontal direction. This enables the projector 20 to determine image distortion in the horizontal direction based on the brightness index value distribution information.

However, a peak position P1 on the wall 10 sensed by the sensor 60 is on the left of an actual peak position P0, as shown in FIG. 6. This is because the optical axis of the sensor 60 is on the left of the optical axis of the lens 198. Moreover, the peak position changes depending on the projection distance.

The correction information generation section 120 generates the correction information which reflects such a difference. The function of the correction information generation section 120 is described below.

Figure 7:
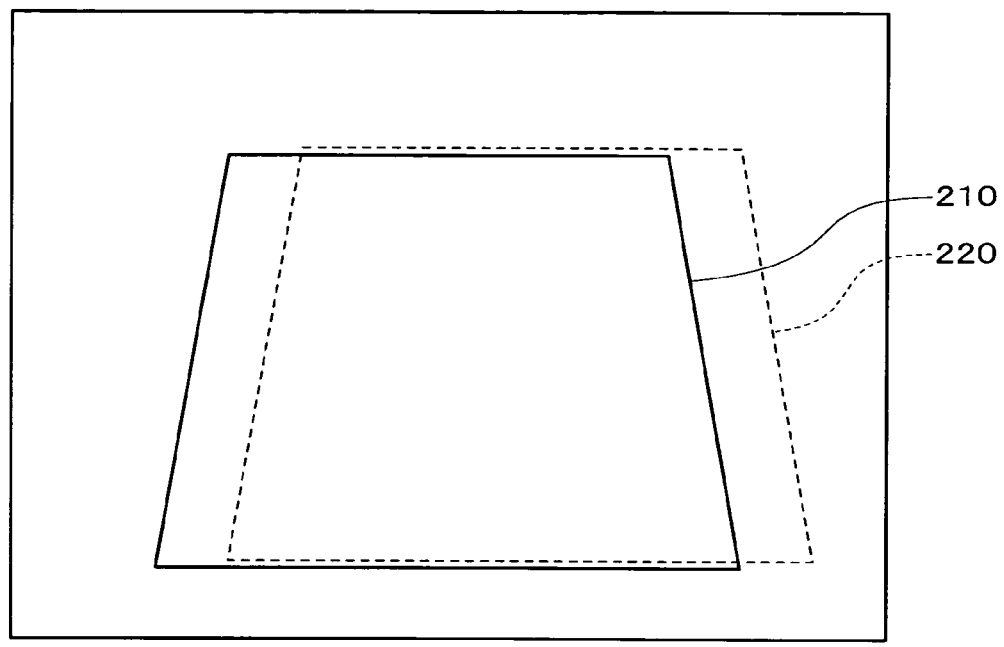
FIG. 7 is a schematic diagram showing the relationship between a projected image on a sensing plane and a projection distance.

FIG. 7 is a schematic diagram showing the relationship between a projected image on a sensing plane and a projection distance. FIG. 8 is a table showing an example of the relationship between a midpoint camera coordinate and a projection distance.

As shown in FIG. 7, the sensor 60 senses a projected image 210 when the projection distance is 5 m to the left of a projected image 220 when the projection distance is 1 m. Specifically, the sensor 60 senses the projected image to the right as the projection distance is decreased.

The correction information generation section 120 calculates a coordinate position X of the midpoint of the lower side AD of the projected image ABCD shown in FIG. 4 on the sensing plane based on the edge point information from the image analysis section 150. The coordinate position X is one type of projected image size information which shows the size of the projected image on the sensing plane of the sensor 60. The correction information generation section 120 calculates the projection distance based on the coordinate position X using the table shown in FIG. 8.

The relationship between the midpoint coordinate position and the projection distance may be calculated in advance by the manufacturer or the like by experiments or the like. The correction information generation section 120 may use a function which outputs the projection distance when the coordinate position X is input instead of using the table.

The correction information generation section 120 calculates the projection distance based on the position of the projected image on the sensing plane in this manner.

The correction information generation section 120 adjusts the correction information based on the zoom state of the lens 198.

Figure 9:
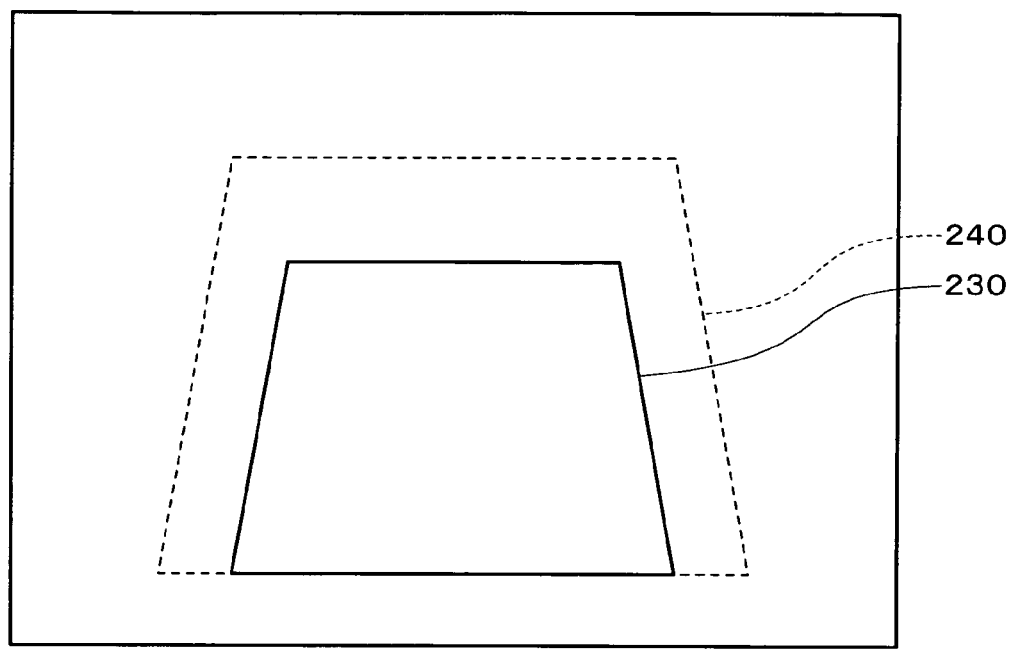
FIG. 9 is a schematic diagram showing the relationship between a projected image on a sensing plane and a zoom state.

FIG. 9 is a schematic diagram showing the relationship between a projected image on a sensing plane and a zoom state. FIG. 10 is a table showing an example of the relationship between a side length and a half angle of view.

In the case where the zoom state is a wide state, the sensor 60 senses a projected image 240 larger than a projected image 230 whose zoom state is a tele state. Since the image projection section 190 is a shift projection optical system, the lower sides of the projected images 230 and 240 on the sensing plane exist on a single line as shown in FIG. 9.

The relationship between the length of AB+CD of the projected image ABCD shown in FIG. 4 and the half angle of view of the lens 198 which shows the zoom state is shown by the table shown in FIG. 10, for example. When the length of AB+CD is 665 dots, the half angle of view is 22° and the lens 198 is in the wide state, for example. When the length of AB+CD is 459 dots, the half angle of view is 15° and the lens 198 is in the tele state, for example.

The correction information generation section 120 generates the temporary correction information based on the half angle of view calculated based on the size of the projected image. In this embodiment, the projection angle in the horizontal direction is employed as the temporary correction information and the correction information.

The correction information generation section 120 generates the correction information based on the temporary correction information and the projection distance.

FIG. 11 is a table showing an example of the relationship among temporary correction information, projection distance, and correction information.

The correction information generation section 120 generates the correction information using the table shown in FIG. 11, for example.

As shown in FIG. 6, the projection angle of the image projection section 190 in the horizontal direction sensed by the sensor 60 is denoted by $\theta t$, the angle which shows the zoom state of the image projection section 190 is denoted by $\theta z$ (zoom state information), the width of the projected image on the sensing plane is denoted by N, the length between the sensor 60 and the intersecting point of the optical axis of the sensor 60 and the line segment N is denoted by L, which shows the number of dots of the sensing plane, and the length between the intersecting point of the line segment N and a line which connects the sensor 60 and the peak position P1 sensed by the sensor 60 and the edge point of the line segment N is denoted by P, for example.

In this case, $\tan \theta t$ equals $(N/2-P)/L$. The correction information generation section 120 calculates N and P based on the brightness index value distribution information as shown in FIG. 5. As shown in FIG. 6, $\tan \theta z$ equals $(N/2)/L$. Since $\theta z$ is known, L can be calculated.

Therefore, since the correction information generation section 120 can calculate all the variables N, P, and L, the correction information generation section 120 can calculate the projection angle $\theta t$ of the image projection section 190 in the horizontal direction sensed by the sensor 60 as the temporary correction information.

The correction information generation section 120 calculates the true projection angle $\theta$ of the image projection section 190 in the horizontal direction by referring to the table shown in FIG. 11 based on the projection angle $\theta t$ and the projection distance calculated by the processing described with reference to FIG. 8.

Image Processing Flow

An image processing flow using the above-described sections is described below.

Figure 12:
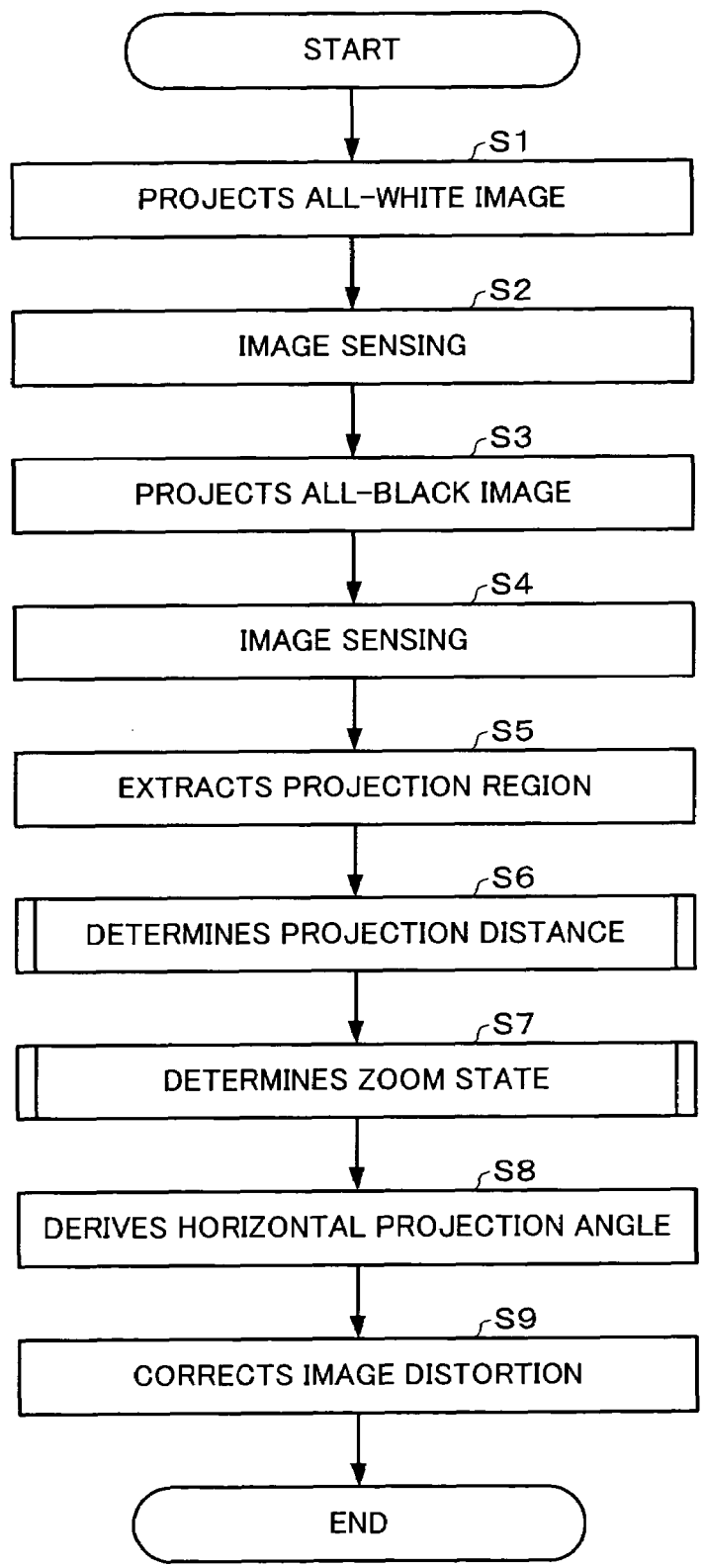
FIG. 12 is a flowchart showing image processing according to one embodiment of the present invention.

FIG. 12 is a flowchart showing image processing according to one embodiment of the present invention.

The manufacturer of the projector 20 creates the tables as shown in FIGS. 8, 10, and 11, and stores the created tables in the memory of the projector 20 before shipment of the projector 20.

The calibration image information generation section 170 generates image information for displaying an all-white image (calibration image in which the entire image is white), and the image projection section 190 projects an all-white image based on the image information (step S1).

The sensor 60 senses the all-white image on the wall 10 and generates the sensing information (step S2).

The calibration image information generation section 170 generates image information for displaying an all-black image (calibration image in which the entire image is black), and the image projection section 190 projects an all-black image based on the image information (step S3).

The sensor 60 senses the all-black image on the wall 10 and generates the sensing information (step S4).

The image analysis section 150 extracts the region of the projected image on the sensing plane based on the difference between the sensing information on the all-white image and the sensing information on the all-black image (step S5).

The image analysis section 150 generates the edge point information which shows the positions of the four corners of the projected image and the brightness index value distribution information which shows the distribution of the luminance values of the projected image.

The correction information generation section 120 performs projection distance determination processing (step S6).

Figure 13:
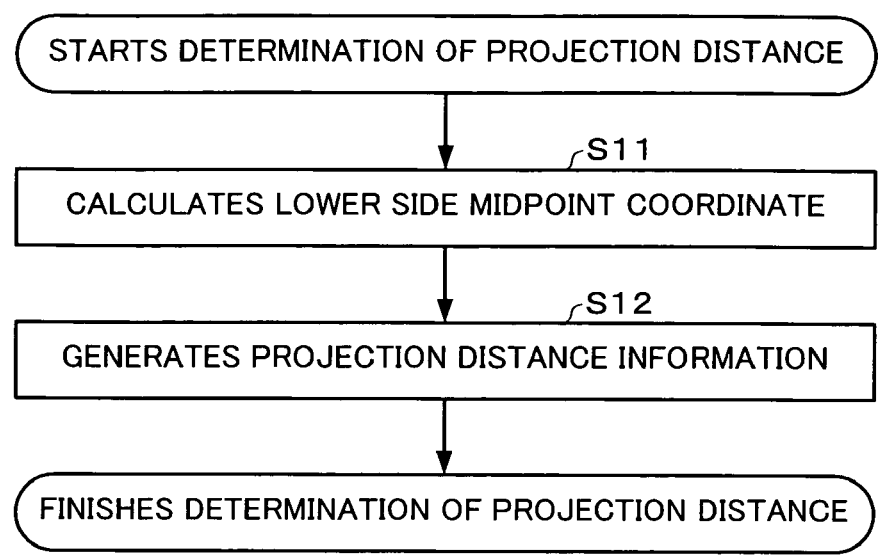
FIG. 13 is a flowchart showing determination of projection distance according to one embodiment of the present invention.

FIG. 13 is a flowchart showing determination of projection distance according to one embodiment of the present invention.

The correction information generation section 120 calculates the coordinate position of the midpoint of the lower side AD based on the edge point information from the image analysis section 150 (step S11).

The correction information generation section 120 generates projection distance information which shows the projection distance based on the coordinate position and the table shown in FIG. 8 (step S12).

The correction information generation section 120 performs zoom state determination processing (step S7).

Figure 14:
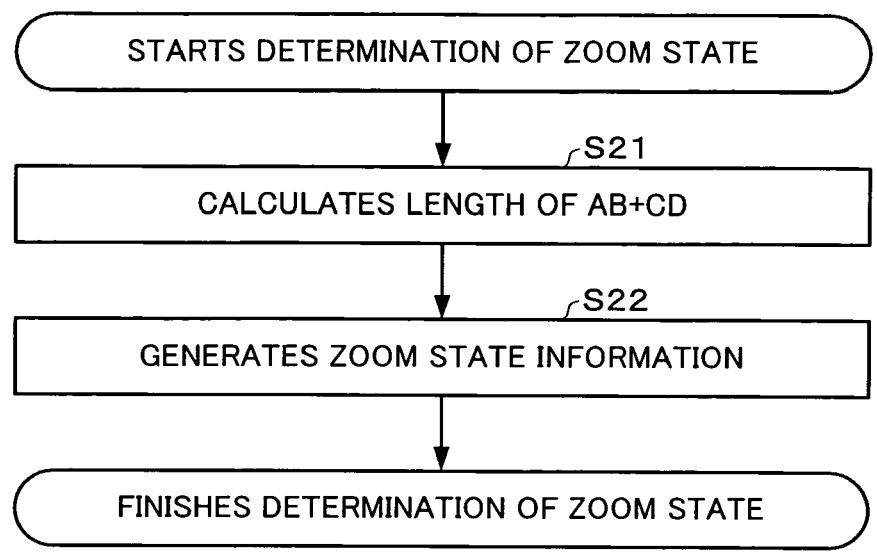
FIG. 14 is a flowchart showing zoom state determination according to one embodiment of the present invention.

FIG. 14 is a flowchart showing zoom state determination according to one embodiment of the present invention.

The correction information generation section 120 calculates the length of AB+CD based on the edge point information from the image analysis section 150 (step S21).

The correction information generation section 120 generates zoom state information which shows the zoom state (angle θz) based on the length and the table shown in FIG. 10 (step S22).

The correction information generation section 120 calculates the projection angle θ in the horizontal direction using the above equation based on the brightness index value distribution information and the projection distance information (step S8).

The distortion correction section 130 corrects the table for correcting the image signal based on the projection angle θ and the zoom state information. In more detail, in the case where the zoom state information shows the tele state, the distortion correction section 130 relatively decreases the amount of correction in the table in comparison with the case where the zoom state information shows the wide state.

The distortion correction section 130 corrects the image signal from the signal input section 110 using the table, and outputs the corrected image signal to the signal output section 160 (step S9).

The image projection section 190 projects an image of which distortion is appropriately corrected based on the image signal from the signal output section 160.

This enables the projector 20 to project an image in which distortion of the projected image 12, in particular, distortion of the projected image 12 in the horizontal direction is appropriately adjusted.

As described above, according to this embodiment, the projector 20 can determine image distortion based on the distribution of the brightness index values (luminance values). In particular, in the case where the optical axis of the lens 198 does not coincide with the optical axis of the sensor 60, the distribution of the brightness index values of the projected image sensed by the sensor 60 changes depending on the projection distance.

According to this embodiment, the projector 20 can generate the temporary correction information based on the distribution of the brightness index values, correct the temporary correction information on the basis of the projection distance to generate the correction information, and correct the image signal based on the correction information so as to adjust image distortion.

As described above, according to this embodiment, the projector 20 can automatically correct distortion of the projected image 12 in the horizontal direction by performing the image processing based on the distribution of the brightness index values, without using information on the shape of the projection target (shape of the projection target, the length of the frame, or the like). Moreover, the projector 20 can more accurately correct distortion of the projected image 12 in the horizontal direction by generating the correction information based on the projection distance.

Specifically, according to this embodiment, distortion of the projected image 12 can be corrected without using the four corners of the wall 10. Therefore, since various projection targets (white board, wall 10, screen, for example) can be applied as the projection target, universality can be further increased. The projector 20 may correct distortion of the projected image 12 in the vertical direction in addition to distortion in the horizontal direction.

According to this embodiment, the projector 20 can more accurately correct image distortion by adjusting the amount of correction of the image signal correction table based on the zoom state at the time of image projection.

According to this embodiment, the projector 20 can determine the projection distance and the zoom state by image processing without using special hardware for determining the projection distance and the zoom state.

According to this embodiment, the projector 20 can determine distortion of the projected image 12 based on the peak position.

According to this embodiment, since image distortion can be corrected using one sensor 60, an image processing system which has a simplified structure and can be manufactured at low cost can be provided to a user in comparison with a method of detecting the three-dimensional coordinates of the projected image using a plurality of CCD cameras or the like.

Modification

The application of the present invention is not limited to the above-described embodiments.

For example, the projector 20 may determine the projection distance and the zoom state by using hardware information instead of determining the projection distance and the zoom state by image processing.

Figure 15:
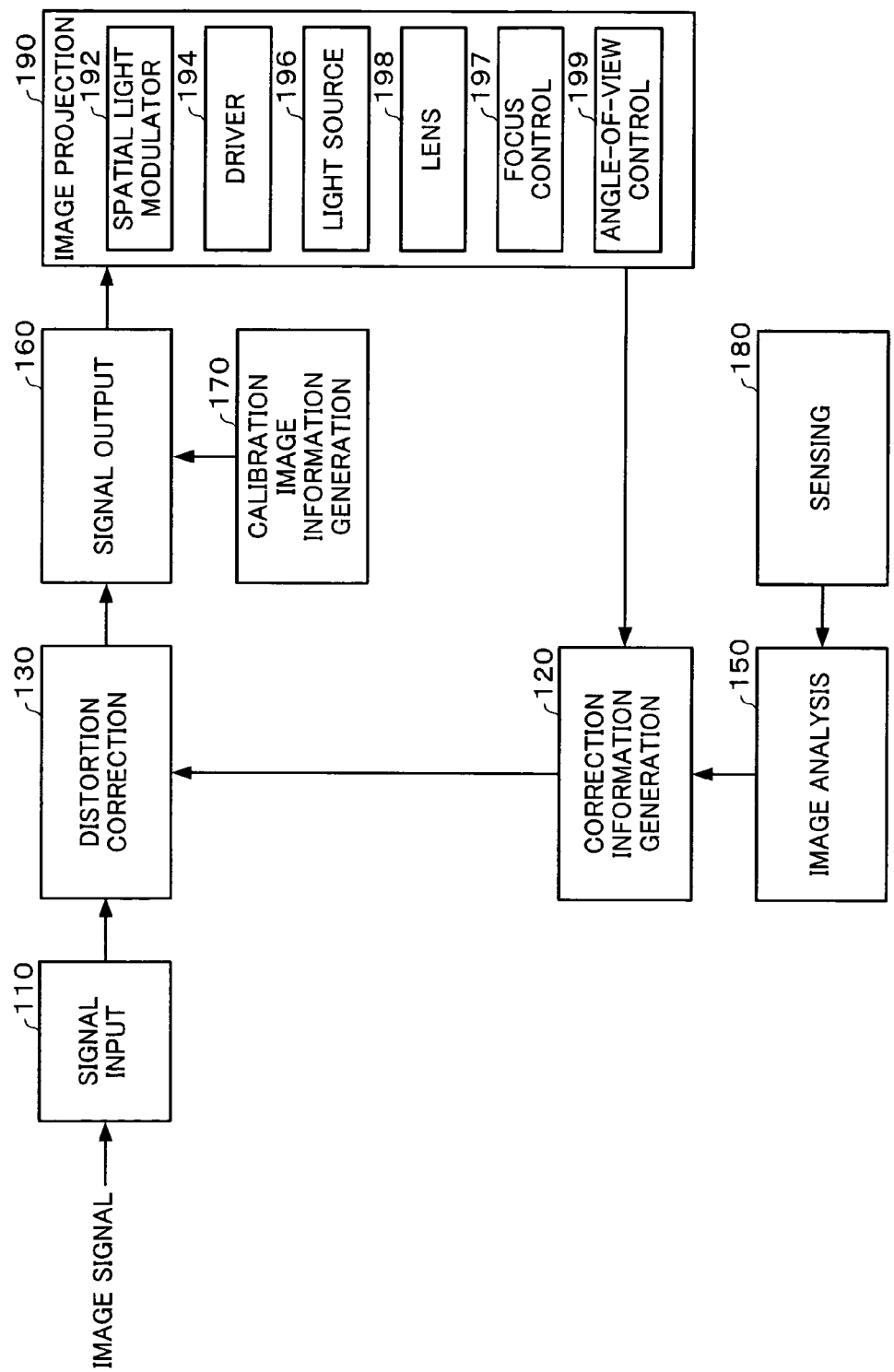
FIG. 15 is a functional block diagram showing a projector according to one embodiment of the present invention.

FIG. 15 is a functional block diagram showing another projector 20 according to one embodiment of the present invention.

In addition to the above-described configuration, the image projection section 190 of the projector 20 in this embodiment includes: a focus control section 197 which controls the focus of the lens 198 and includes focus state information which shows a focus value which is changed by the control; and an angle-of-view control section 199 which controls the angle of view of the lens 198 (zoom state) and has zoom state information which shows a zoom value which is changed by the control.

The correction information generation section 120 in this modification is configured to generate the projection distance information which shows the projection distance based on the focus state information of the focus control section 197 and to adjust the amount of correction of the image signal based on the correction information based on the zoom state information of the angle-of-view control section 199.

According to this configuration, the projector 20 can determine the projection distance and the zoom state using the hardware information of the image projection section 190. The control by the focus control section 197 and the angle-of-view control section 199 may be automatic control or manual control.

In this case, since the projection distance information is generated from the focus state information, the image analysis section 150 need not generate the edge point information. Specifically, the correction information generation section 120 may determine the shape of the projected image or the like from the brightness index value distribution information, for example.

In the above-described embodiments, the projector 20 uses the information which shows the coordinate positions of the four corners of the projected image on the sensing plane as the edge point information. However, the projector 20 may use information which shows the coordinate positions of three vertices or less of the projected image on the sensing plane, information which shows the coordinate position of the midpoint between the vertices of the projected image on the sensing plane, or the like.

In the above-described embodiments, the projector 20 uses the luminance value as the brightness index value. However, the projector 20 may use an image signal value such as an RGB value or Y value, for example.

In the above-described embodiments, the projector 20 uses the projection angle in the horizontal direction as the temporary correction information and the correction information. However, the projector 20 may use a correction coefficient, a correction parameter value, or the like.

In the above-described embodiments, the projector 20 is used as the image processing system. However, the present invention is also effective for an image processing system for a display such as a cathode ray tube (CRT), light emitting diode (LED), or electroluminescence (EL) in addition to the projector 20.

As the projector 20, a liquid crystal projector, a projector using a digital micromirror device (DMD), or the like may be used. DMD is a trademark of Texas Instruments, Inc. (U.S.A.).

The function of the projector 20 may be implemented by only a projector, or may be distributed in a plurality of processing devices (distributed processing of projector and PC, for example). The sensor 60 may be configured as a device independent of the projector 20 instead of a device included in the projector 20.

What is claimed is:

1. An image processing system comprising:
    correction means for correcting an image signal so as to adjust image distortion;
    image projection means for projecting an image based on the image signal;
    sensing means for sensing the projected image along an optical axis which does not coincide with an optical axis of the image projection means in order to generate sensing information;
    image analysis means for generating edge point information and brightness index value distribution information, based on the sensing information, the edge point information showing a position of a predetermined edge point of the projected image in the sensed image, and the brightness index value distribution information showing a distribution of brightness index values of the projected image; and
    correction information generation means for generating projection distance information which shows a projection distance, based on the edge point information, and generating correction information for correcting the image signal, based on the projection distance information and the brightness index value distribution information;
    wherein the correction information generation means generates temporary correction information based on the brightness index value distribution information and corrects the temporary correction information to generate the correction information in which the optical axis of the sensing means coincides with the optical axis of the image projection means, based on the projection distance information; and
    wherein the correction means corrects the image signal based on the correction information.

2. The image processing system as defined in claim 1, wherein:
    the correction information generation means generates projected image size information which shows a size of the projected image in the sensed image, based on the edge point information, and generates zoom state information which shows a zoom state of the image projection means, based on the projected image size information; and
    the correction means uses the zoom state information to adjust an amount of correction of the image signal based on the correction information.

3. The image processing system as defined in claim 1, wherein:
    the brightness index value distribution information includes information showing the brightest peak position of the projected image in the sensed image; and
    the correction information generation means generates the temporary correction information based on the information showing the brightest peak position, the edge point information, and the projection distance information.

4. An image processing system comprising:
    correction means for correcting an image signal so as to adjust image distortion;
    image projection means for projecting an image based on the image signal, having a focus control function;
    sensing means for sensing the projected image along an optical axis which does not coincide with an optical axis of the image projection means in order to generate sensing information;
    image analysis means for generating brightness index value distribution information which shows a distribution of brightness index values of the projected image in the sensed image, based on the sensing information; and
    correction information generation means for generating projection distance information which shows a projection distance, based on focus state information which shows a focus state of the image projection means, and generating correction information for correcting the image signal, based on the projection distance information and the brightness index value distribution information;
    wherein the correction information generation means generates temporary correction information based on the brightness index value distribution information and corrects the temporary correction information to generate the correction information in which the optical axis of the sensing means coincides with the optical axis of the image projection means, based on the projection distance information; and
    wherein the correction means corrects the image signal based on the correction information.

5. The image processing system as defined in claim 4, wherein:
    the image projection means has a function of controlling an angle-of-view; and
    the correction information generation means uses zoom state information which shows a zoom state of the image projection means to adjust an amount of correction of the image signal based on the correction information.

6. The image processing system as defined in claim 4, wherein:
the brightness index value distribution information includes information on the brightest peak position of the projected image in the sensed image;
the image analysis means generates edge point information showing a position of a predetermined edge point of the projected image in the sensed image; and
the correction information generation means generates the temporary correction information based on the information showing the brightest peak position, the edge point information, and the projection distance information.

7. An image processing system comprising:
a correction section which corrects an image signal so as to adjust image distortion;
an image projection section which projects an image based on the image signal;
a sensing section which senses the projected image along an optical axis which does not coincide with an optical axis of the image projection section in order to generate sensing information;
an image analysis section which generates edge point information and brightness index value distribution information, based on the sensing information, the edge point information showing a position of a predetermined edge point of the projected image in the sensed image, and brightness index value distribution information showing a distribution of brightness index values of the projected image; and
a correction information generation section which generates projection distance information showing a projection distance, based on the edge point information, and generates correction information for correcting the image signal, based on the projection distance information and the brightness index value distribution information;
wherein the correction information generation section generates temporary correction information based on the brightness index value distribution information and corrects the temporary correction information to generate the correction information in which the optical axis of the sensing section coincides with the optical axis of the image projection section, based on the projection distance information; and
wherein the correction section corrects the image signal based on the correction information.

8. An image processing system comprising:
a correction section which corrects an image signal so as to adjust image distortion;
an image projection section which has a focus control function and projects an image based on the image signal;
a sensing section which senses the projected image along an optical axis which does not coincide with an optical axis of the image projection section in order to generate sensing information;
an image analysis section which generates brightness index value distribution information which shows a distribution of brightness index values of the projected image in the sensed image, based on the sensing information; and
a correction information generation section which generates projection distance information which shows a projection distance, based on focus state information which shows a focus state of the image projection section, and generates correction information for correcting the image signal, based on the projection distance information and the brightness index value distribution information;
wherein the correction information generation section generates temporary correction information based on the brightness index value distribution information and corrects the temporary correction information to generate the correction information in which the optical axis of the sensing section coincides with the optical axis of the image projection section, based on the projection distance information; and
wherein the correction section corrects the image signal based on the correction information.

9. A projector comprising:
correction means for correcting an image signal so as to adjust image distortion;
image projection means for projecting an image based on the image signal;
sensing means for sensing the projected image along an optical axis which does not coincide with an optical axis of the image projection means in order to generate sensing information;
image analysis means for generating edge point information and brightness index value distribution information, based on the sensing information, the edge point information showing a position of a predetermined edge point of the projected image in the sensed image, and brightness index value distribution information showing a distribution of brightness index values of the projected image; and
correction information generation means for generating projection distance information which shows a projection distance, based on the edge point information, and generating correction information for correcting the image signal, based on the projection distance information and the brightness index value distribution information;
wherein the correction information generation means generates temporary correction information based on the brightness index value distribution information and corrects the temporary correction information to generate the correction information in which the optical axis of the sensing means coincides with the optical axis of the image projection means, based on the projection distance information; and
wherein the correction means corrects the image signal based on the correction information.

10. A projector comprising:
correction means for correcting an image signal so as to adjust image distortion;
image projection means for projecting an image based on the image signal, having a focus control function;
sensing means for sensing the projected image along an optical axis which does not coincide with an optical axis of the image projection means in order to generate sensing information;
image analysis means for generating brightness index value distribution information which shows a distribution of brightness index values of the projected image in the sensed image, based on the sensing information; and
correction information generation means for generating projection distance information which shows a projection distance, based on focus state information which shows a focus state of the image projection means, and generating correction information for correcting the image signal, based on the projection distance information and the brightness index value distribution information;

wherein the correction information generation means generates temporary correction information based on the brightness index value distribution information and corrects the temporary correction information to generate the correction information in which the optical axis of the sensing means coincides with the optical axis of the image projection means, based on the projection distance information; and wherein the correction means corrects the image signal based on the correction information.

11. A projector comprising:

a correction section which corrects an image signal so as to adjust image distortion;

an image projection section which projects an image based on the image signal;

a sensing section which senses the projected image along an optical axis which does not coincide with an optical axis of the image projection section in order to generate sensing information;

an image analysis section which generates edge point information and brightness index value distribution information, based on the sensing information, the edge point information showing a position of a predetermined edge point of the projected image in the sensed image, and brightness index value distribution information showing a distribution of brightness index values of the projected image; and a correction information generation section which generates projection distance information showing a projection distance, based on the edge point information, and generates correction information for correcting the image signal, based on the projection distance information and the brightness index value distribution information;

wherein the correction information generation section generates temporary correction information based on the brightness index value distribution information and corrects the temporary correction information to generate the correction information in which the optical axis of the sensing section coincides with the optical axis of the image projection section, based on the projection distance information; and wherein the correction section corrects the image signal based on the correction information.

12. A projector comprising:

a correction section which corrects an image signal so as to adjust image distortion;

an image projection section which has a focus control function and projects an image based on the image signal;

a sensing section which senses the projected image along an optical axis which does not coincide with an optical axis of the image, projection section in order to generate sensing information;

an image analysis section which generates brightness index value distribution information which shows a distribution of brightness index values of the projected image in the sensed image, based on the sensing information; and a correction information generation section which generates projection distance information which shows a projection distance, based on focus state information which shows a focus state of the image projection section, and generates correction information for correcting the image signal, based on the projection distance information and the brightness index value distribution information;

wherein the correction information generation section generates temporary correction information based on the brightness index value distribution information and corrects the temporary correction information to generate the correction information in which the optical axis of the sensing section coincides with the optical axis of the image projection section, based on the projection distance information; and wherein the correction section corrects the image signal based on the correction information.

13. An information storage medium storing a computer-readable program causing a computer to function as:

correction means for correcting an image signal so as to adjust image distortion;

image projection means for projecting an image based on the image signal;

sensing means for sensing the projected image along an optical axis which does not coincide with an optical axis of the image projection means in order to generate sensing information;

image analysis means for generating edge point information and brightness index value distribution information, based on the sensing information, the edge point information showing a position of a predetermined edge point of the projected image in the sensed image, and brightness index value distribution information showing a distribution of brightness index values of the projected image; and correction information generation means for generating projection distance information which shows a projection distance, based on the edge point information, and generating correction information for correcting the image signal, based on the projection distance information and the brightness index value distribution information;

wherein the correction information generation means generates temporary correction information based on the brightness index value distribution information and corrects the temporary correction information to generate the correction information in which the optical axis of the sensing means coincides with the optical axis of the image projection means, based on the projection distance information; and wherein the correction means corrects the image signal based on the correction information.

14. An information storage medium storing a computer-readable program causing a computer to function as:

correction means for correcting an image signal so as to adjust image distortion;

image projection means for projecting an image based on the image signal, having a focus control function;

sensing means for sensing the projected image along an optical axis which does not coincide with an optical axis of the image projection means in order to generate sensing information;

image analysis means for generating brightness index value distribution information which shows a distribution of brightness index values of the projected image in the sensed image, based on the sensing information; and correction information generation means for generating projection distance information which shows a projection distance, based on focus state information which shows a focus state of the image projection means, and generating correction information for correcting the image signal, based on the projection distance information and the brightness index value distribution information;

wherein the correction information generation means generates temporary correction information based on the brightness index value distribution information and corrects the temporary correction information to generate the correction information in which the optical axis of the sensing means coincides with the optical axis of the image projection means, based on the projection distance information; and wherein the correction means corrects the image signal based on the correction information.

15. An image processing method comprising:

projecting a predetermined calibration image onto a predetermined projection target by using an image projection section;

sensing the projected image along an optical axis which does not coincide with an optical axis of the image projection section in order to generate sensing information by using a sensing section;

generating edge point information and brightness index value distribution information, based on the sensing information, the edge point information showing a position of a predetermined edge point of the projected image in the sensed image, and the brightness index value distribution information showing a distribution of brightness index values of the projected image;

generating projection distance information which shows a projection distance based on the edge point information;

generating temporary correction information based on the brightness index value distribution information;

correcting the temporary correction information to generate the correction information in which an optical axis of the sensing section coincides with the optical axis of the image projection section, based on the projection distance information; and correcting an image signal based on the correction information so as to adjust image distortion.

16. The image processing method as defined in claim 15, wherein:

projected image size information which shows a size of the projected image in the sensed image is generated based on the edge point information when generating the correction information;

zoom state information which shows a zoom state at the time of image projection is generated based on the projected image size information; and the zoom state information is used to adjust an amount of correction of the image signal based on the correction information.

17. The image processing method as defined in claim 15, wherein:

the brightness index value distribution information includes information on the brightest peak position of the projected image in the sensed image; and the temporary correction information is generated based on the information showing the brightest peak position, the edge point information, and the projection distance information.

18. An image processing method using a computer, wherein:

the computer uses an image projection section having a focus control function to project a predetermined calibration image onto a predetermined projection target;

the computer senses the projected image along an optical axis which does not coincide with an optical axis of the image projection section in order to generate sensing information by using a sensing section;

the computer generates brightness index value distribution information which shows a distribution of brightness index values of the projected image, based on the sensing information;

the computer generates projection distance information which shows a projection distance, based on focus state information which shows a focus state of the image projection section;

the computer generates temporary correction information based on the brightness index value distribution information;

the computer corrects the temporary correction information to generate the correction information in which an optical axis of the sensing section coincides with the optical axis of the image projection section, based on the projection distance information; and the computer corrects an image signal for image projection, based on the correction information so as to adjust image distortion.

19. The image processing method as defined in claim 18, wherein:

the image projection section has a function of controlling an angle-of-view; and the computer uses zoom state information which shows a zoom state of the image projection section to adjust an amount of correction of the image signal based on the correction information.

20. The image processing method as defined in claim 18, wherein:

the brightness index value distribution information includes information showing the brightest peak position of the projected image in the sensed image; and the computer generates edge point information showing a position of a predetermined edge point of the projected image in the sensed image, and generates the temporary correction information based on the information showing the brightest peak position, the edge point information, and the projection distance information.

* * * * *